US008073793B2

(12) United States Patent
Galvin et al.

(10) Patent No.: US 8,073,793 B2
(45) Date of Patent: Dec. 6, 2011

(54) DETERMINING A COMMON SOCIAL CONTEXT

(75) Inventors: James P. Galvin, Georgetown, KY (US); Amy D. Travis, Arlington, MA (US); Sara Weber, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 11/946,786

(22) Filed: Nov. 28, 2007

(65) Prior Publication Data

US 2009/0138806 A1    May 28, 2009

(51) Int. Cl.
*G06N 5/00* (2006.01)
(52) U.S. Cl. .............................. 706/45; 705/80; 715/853
(58) Field of Classification Search ............... 706/45; 705/27, 80; 715/853
See application file for complete search history.

(56) References Cited

U.S. PATENT DOCUMENTS

| | | | |
|---|---|---|---|
| 7,085,365 | B2 | 8/2006 | Kauppinen |
| 7,092,006 | B2 | 8/2006 | Walker et al. |
| 7,095,328 | B1 | 8/2006 | Stern et al. |
| 7,096,255 | B2 | 8/2006 | Malik |
| 7,167,910 | B2 | 1/2007 | Farnham et al. |
| 2004/0088325 | A1 | 5/2004 | Elder et al. |
| 2005/0165715 | A1 | 7/2005 | Farnham et al. |
| 2006/0168530 | A1 | 7/2006 | Muller et al. |

OTHER PUBLICATIONS

Freeman, "Visualizing Social Networks", Journal of Social Structure (2000).
Fiore, "Visualization Components for Persistent Conversations", <www.research.microsoft.com> Sep. 21, 2000.
McDonald, "Recommending Collaboration with Social Networks: A Comparative Evaluation", Proceedings of the SIGCHI Conference on Human Factors in Computing Systems, CHI '03, Ft. Lauderdale, Florida (Apr. 5-10, 2003).
Kaugars, "Integrated Multi-Scale Text Retrieval Visualization", CHI 98 Conference Summary on Human Factors in Computing Systems, CHI '98 (Apr. 18-23, 1998).
Schwartz, "Discovering Shared Interests Using Graph Analysis", Communications of the ACM, vol. 36, issue 8 (Aug. 1993).
Joyent Connector Software, <http://joyent.com/connector/collaboration-suite/features/> (Last visited Nov. 28, 2007).
Foldera Activity Folders, <http://www.foldera.com/activityfolders.htm#> (Last visited Nov. 28, 2007).
JotSpot, <http://www.jot.com/google/faq.html#14> (Last visited Nov. 28, 2007).
Microsoft Unified Communications, <http://www.microsoft.com/uc/default.mspx> (Last visited Nov. 28, 2007).
Second Life, <http://secondlife.com/whatis/explore.php> (Last visited Nov. 28, 2007).
There.com, <http://www.there.com> (Last visited Nov. 28, 2007).

*Primary Examiner* — Jeffrey A Gaffin
*Assistant Examiner* — Mai T Tran
(74) *Attorney, Agent, or Firm* — Cuenot, Forsythe & Kim, LLC

(57) ABSTRACT

A computer-implemented method of determining a common social context can include detecting a collaboration between a plurality of participants. The method can include identifying a plurality of common social contexts and determining a probability that the collaboration belongs to each of the plurality of common social contexts. At least one probability and corresponding common social context can be output.

20 Claims, 4 Drawing Sheets

DETERMINING A COMMON SOCIAL CONTEXT

BACKGROUND OF THE INVENTION

Over time an ever expanding list of communication channels have appeared for person-to-person communications. Early technologies, such as telephony, have led to new communication technologies such as the World Wide Web, wireless technologies, electronic mail, newsgroups, chat, instant messaging, and file sharing applications. These different forms of communication, which may be referred to as "collaborative applications," allow groups of two or more users to share information, ideas, and/or data in a collaborative way.

Collaborative applications have gained in popularity in corporate and non-profit organizations, online communities, and social networks since they facilitate communication and information exchange. As organizations grow, the popularity of collaborative applications makes it difficult for users to oversee the large number of collaborative events occurring at any given time. This in turn makes it difficult for users to identify which collaborations may be of interest.

Each collaboration deals with a particular subject, which can be referred to as a common social context. The concept of a common social context attempts to describe a wide variety of social interactions that may bring a group of two or more people together to communicate in a non-random fashion. Common social contexts relate to the subject matter shared within some collaborative interaction rather than the collaborative application used to facilitate the collaboration. For example, common social contexts can include the sports discussed in a chat room, the product information within a document shared at a business meeting, and/or the personal relationship information exchanged between two people in a series of electronic mails. As can be seen, common social contexts relate to the subject matter or theme contained in a collaborative interaction, not the mechanism for the collaboration.

BRIEF SUMMARY OF THE INVENTION

One embodiment of the present invention can include a computer-implemented method of determining a common social context. The method can include detecting a collaboration between a plurality of participants. The method further can include identifying a plurality of common social contexts and determining a probability that the collaboration belongs to each of the plurality of common social contexts. At least one probability and corresponding common social context can be output.

Another embodiment of the present invention can include a computer-implemented method of visualizing collaborations related to a common social context. The method can include selecting a common social context in response to a user input. One or more collaborations related to the common social context can be identified. A plurality of participants of the collaboration and at least one collaborative application used for the collaboration can be identified. A visual representation of the plurality of participants can be presented. The visual representation can be dynamically updated to indicate which of the plurality of participants are communicating and the collaborative application(s) used in real-time.

Yet another embodiment of the present invention can include a computer program product including a computer-readable storage medium having computer-usable program code stored thereon that, when executed, causes a machine to perform the various steps and/or functions described herein.

DETAILED DESCRIPTION OF THE INVENTION

Figure 1:
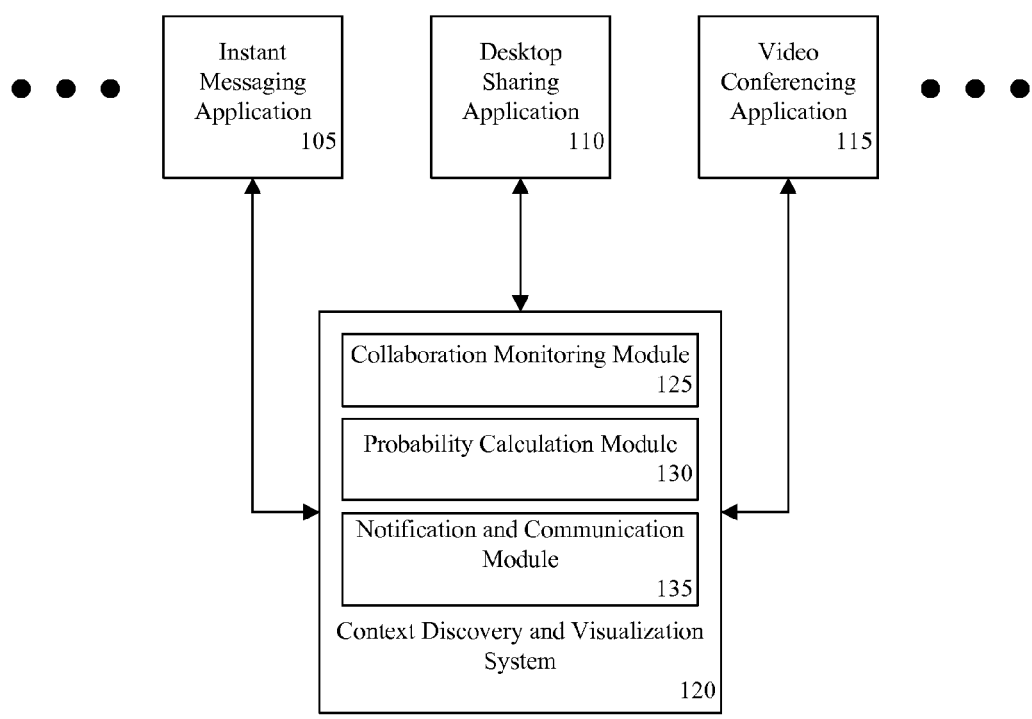
FIG. 1 is a block diagram illustrating a system for determining a common social context in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including, but not limited to, the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with the embodiments disclosed herein a user can monitor a series of collaborative applications for the initiation of a collaboration. Using a set of guidelines, a probability that the collaboration belongs to each of a plurality of common social contexts can be determined. Using these probabilities, a user can be alerted when the probability the collaboration belongs to a selected common social context that is of interest to the user reaches a minimum threshold level. In this way, the user can be alerted of collaborations involving common social contexts of interest to the user. This frees the user from having to constantly and manually monitor many different active collaborations.

Further, a visual representation of a collaboration of interest to the user can be provided through a graphical user interface (GUI). The visual representation may display the probability the collaboration is related to one or more common social contexts. The visual representation also may illustrate the collaborative application(s) used for the collaboration as well as the contribution level of the participants involved.

FIG. 1 is a block diagram illustrating a system 100 for determining a common social context in accordance with one embodiment of the present invention. The system 100 can include an instant messaging application 105, a desktop sharing application 110, and a video conferencing application 115. The system 100 also can include a context discovery and visualization system 120 containing a collaboration monitoring module 125, a probability calculation module 130, and a notification and communication module 135. The context discovery and visualization system 120 can communicate with the various collaborative applications 105-115.

The instant messaging application 105, the desktop sharing application 110, and the video conferencing application 115 can represent any number of collaborative systems, applications, and/or tools (hereafter collectively referred to as "collaborative applications") that interface with the context discovery and visualization system 120. Such collaborative applications can include electronic mail, voice mail, voice chat, personal calendars and scheduling tools, IP telephony, Web browsers, data management tools, etc. Collaborative applications allow two or more participants to exchange information, ideas and/or data. As used herein, the term "collaboration" can refer to an exchange between two or more participants that occurs over, or is facilitated through, one or more collaborative applications. A collaboration can occur via various modalities (e.g. visual, auditory, or a combination thereof).

The collaboration monitoring module 125 can communicate with the collaborative applications 105-115, monitoring each for the initiation of a collaboration as well as monitoring ongoing collaborations. The collaboration monitoring module 125 can identify the collaborative application used to initiate a collaboration, the participants involved in the collaboration, as well as the modality of communication (e.g. voice, video, etc.). The collaboration monitoring module 125 also may identify a location, point of initiation, and/or timestamp relating to materials used within the collaboration and/or participants of the collaboration.

For example, the collaboration monitoring module 125 can monitor a videoconference between members of a marketing team in Denver and Houston, time stamping the starting point of the collaboration, and identifying the initiators of the videoconference. Further, the collaboration monitoring module 125 can identify the five participants in the videoconference, files shared by the participants, as well as monitor the content of the collaboration.

The probability calculation module 130 can apply a set of guidelines, e.g., programmatic rules, to the collaborations detected and monitored. The guidelines can be used to determine the probability a given collaboration is related to each of a plurality of common social contexts defined within the context discovery and visualization system 120. Such guidelines can be used in determining the probabilities through evaluation, for example, of participants in the collaboration, the initiation point of the collaboration, the collaborative application(s) used for the collaboration, and/or the electronic documents accessed and/or shared during the collaboration. The guidelines also can be used to evaluate project artifacts associated with participants in the collaboration, the organizational role of participants, the geographical location of participants in the collaboration, and the content of the collaboration. It should be appreciated that the examples provided herein are not intended to be an exhaustive listing of the guidelines that may be used, but rather illustrative of the many different factors that can be evaluated in determining the common social context to which a given collaboration belongs.

For example, a collaboration may include the team leader of a software development project "alpha" as a participant. The probability calculation module 130 may access an employee directory identifying the role of the participant as team leader in project alpha. Per the guidelines, the probability calculation module 130 may then increase the probability that the collaboration belongs to a common social context of "alpha." If participants of the collaboration access a section of software code used in the alpha project, for example, from a directory associated with the alpha project, the probability calculation module 130 may further increase the probability that the common social context of the collaboration is "alpha."

Each of the guidelines further may be weighted differently to change the importance of one guideline with respect to the others in determining common social context of collaborations. Default weightings can be provided. Still, user specified weightings can be specified. For example, a user may decide that a collaboration is not of high interest unless the project manager enters the collaboration. By specifying a weight and/or specific guideline, a user can cause the probability calculation module 130 to significantly increase the probability that the collaboration pertains to a selected common social context only when the manager enters the collaboration as a participant. In this manner, the context discovery and visualization system 120 may be customized by individual users. Such customizations would not affect the operation of the system with respect to other users.

The notification and communication module 135 can serve as an interface to the context discovery and visualization system 120. The notification and communication module 135 can transmit, e.g., output, information and receive user input. In one embodiment, the notification and communication module 135 can generate a visual representation of one or more collaborations of interest using data received from the collaboration monitoring module 125 and the probability calculation module 130. The visual representation generated by the notification and communication module 135 may contain collaboration content, probabilities the collaboration belongs to one or more common social contexts, the collaborative applications used within the collaboration, the participants of the collaboration, and the contribution level of each participant to the collaboration. In another embodiment, such information can be output to other systems that can include programming to graphically render such data.

The notification and communication module 135 also can issue alerts when the probability that a given collaboration belongs to a particular common social context exceeds a minimum threshold level. The notification and communication module 135 can allow a user to select a common social context and search for collaborations related to that common social context.

For example, consider the case where a user has an interest in college basketball. The user may request that the context discovery and visualization system 120 search for the common social context "college basketball." The context discovery and visualization system 120 can monitor active collaborations and identify those with some minimal probability of belonging to the common social context "college basketball." The identified collaborations and the corresponding probabilities of those collaborations can be output.

In another embodiment, the user may be notified when the probability calculation module 130 determines that a given collaboration has a probability of belonging to the "collage basketball" common social context that exceeds some threshold, whether default or user-specified. The alerts and/or notifications may be visually presented, e.g., displayed, audibly played, may be a message such as an electronic mail, instant message, or the like.

FIG. 1 represents one possible embodiment for the system 100. The functional blocks described within the context discovery and visualization system 120 may be implemented in a number of ways and still provide the same functionality. For example, two or more of the modules 125-135 may be combined into a single, larger application program. Alternatively, one or more of the modules may be implemented as a series of smaller application programs. The various components described with reference to FIG. 1 may be implemented within one or more information processing systems, e.g., servers, which communicate over a communication network.

Figure 2:
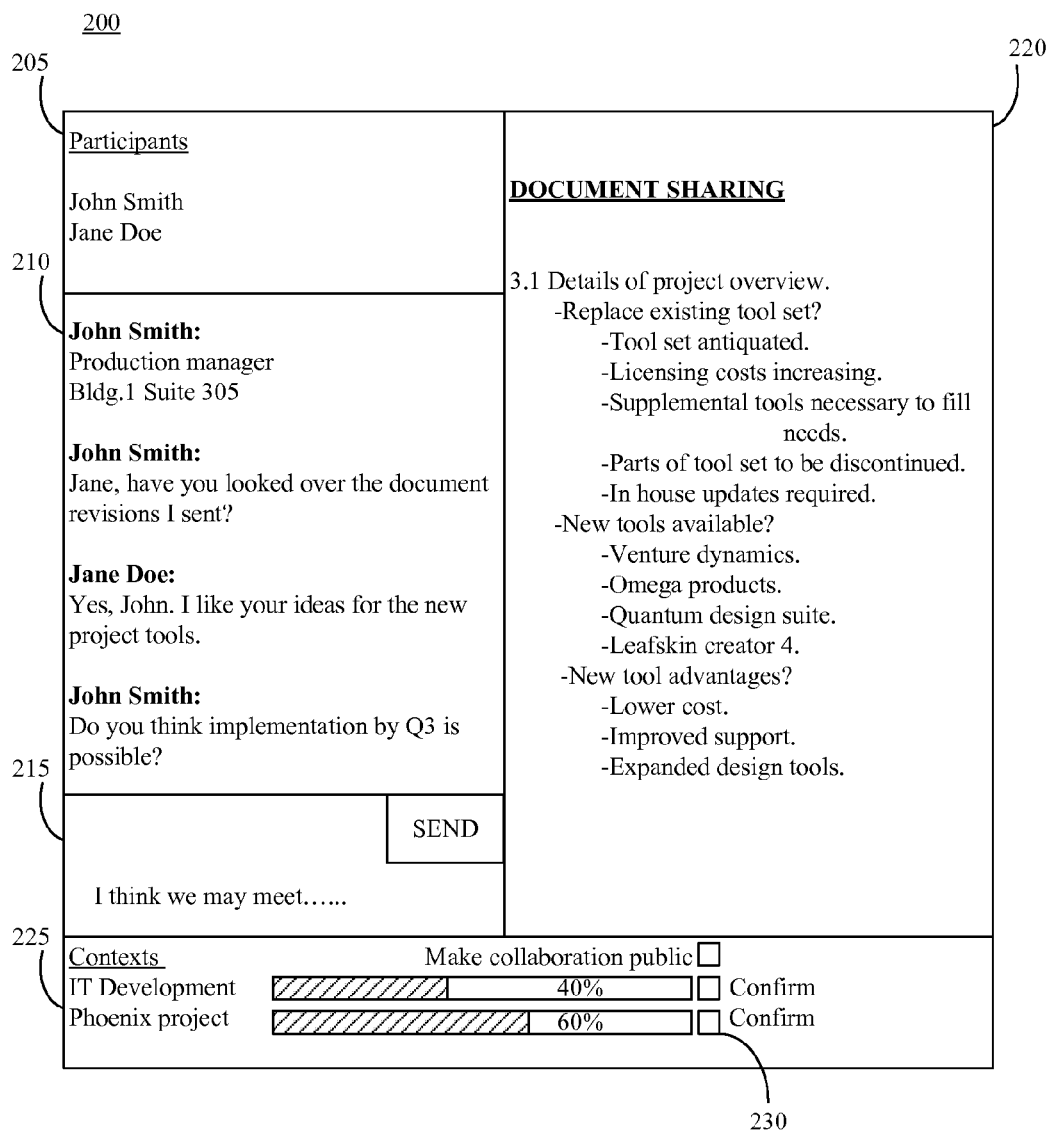
FIG. 2 is a pictorial view illustrating a graphical user interface (GUI) in accordance with another embodiment of the present invention.

FIG. 2 is a pictorial view illustrating a GUI 200 in accordance with another embodiment of the present invention. GUI 200 is one possible embodiment of a visual presentation that may be generated by, or used with, the context discovery and visualization system of FIG. 1. GUI 200 can allow a user to monitor a collaboration in real-time, viewing the contents of the collaboration, electronic documents shared during the collaboration, identify participants in the collaboration, and view the probability the collaboration belongs to one or more particular common social contexts.

GUI 200 is illustrated from the perspective of a participant engaged in the collaboration. It should be appreciated, however, that GUI 200 also may be used and presented to a user not involved in the collaboration, but wishing to monitor the collaboration. For example, a user may view a list of ongoing collaborations, select one for monitoring, and be presented with GUI 200.

In section 205, the participants in the collaboration may be listed. In another embodiment, section 205 can list former participants as well as active participants in the collaboration, allowing the user to see a history of participant involvement in the collaboration. Section 210 can present a view for a instant messaging-based collaborative application showing the communication among the participants. A real-time transcript of the instant messaging session can be displayed in section 210. The text input and/or electronic documents to be shared within the instant messaging session can be entered or dropped in section 215.

Section 220 can display a view for a file sharing application where the participants may simultaneously view and edit the same electronic document. GUI 200 is not limited to presenting views of the collaborative applications displayed in section 210 and 220, but may include views for collaborative applications such as electronic mail, voice mail, voice chat, personal calendar and scheduling tools, IP telephony, Web browsers, and data management tools. As can be seen, the GUI 200 can present views for a plurality of collaborative applications concurrently. In that sense, GUI 200 can present views for a plurality of different collaborative applications that, taken together, may form a single collaboration or relate to a single, common social context.

GUI 200 can display the probability that the collaboration belongs to one or more common social contexts shown in section 225. The two common social contexts illustrated in section 225 may represent the two common social contexts having the highest probability of corresponding to the collaboration presented in GUI 200. Displaying the two common social contexts with the highest probabilities allows the participants, as well as non-participating users, to monitor the most probable subjects for the collaboration. Section 225 also may provide viewers with the ability to provide input confirming that the collaboration belongs to one of the common social contexts displayed. For example, when a participant selects check box 230, the probability that the collaboration belongs to the "Phoenix Project" common social context can be increased by the context discovery and visualization system to 100%.

In another embodiment the user can adjust a minimum threshold level which, when exceeded, results in a user alert. For example, when the context discovery and visualization system determines that the probability that the collaboration belongs to the "Phoenix project" common social context exceeds a threshold, an alert can be issued. The alert may be issued as a pop-up type message or other visual indicator. The alert can indicate that the probability that the collaboration belongs to a given common social context has been exceeded. Such thresholds may be predetermined or user-defined.

Section 225 also may contain a control (e.g. "Make collaboration public") allowing the user to change the status of the collaboration between private and public. As an example, two of the project managers can have an instant messaging session discussing a new organizational chart for a project. While having the discussion, the managers may designate the collaboration as private. Such designation would apply to any collaboration applications involved in the collaboration and, thus, prevent viewing of the instant messaging session and the organizational chart document undergoing revision by any others. Once the discussion concerning reorganization is complete, the managers can re-designate the collaboration as public, thereby allowing the collaboration, e.g., the instant messaging session and document, to be viewed by others.

Figure 3:
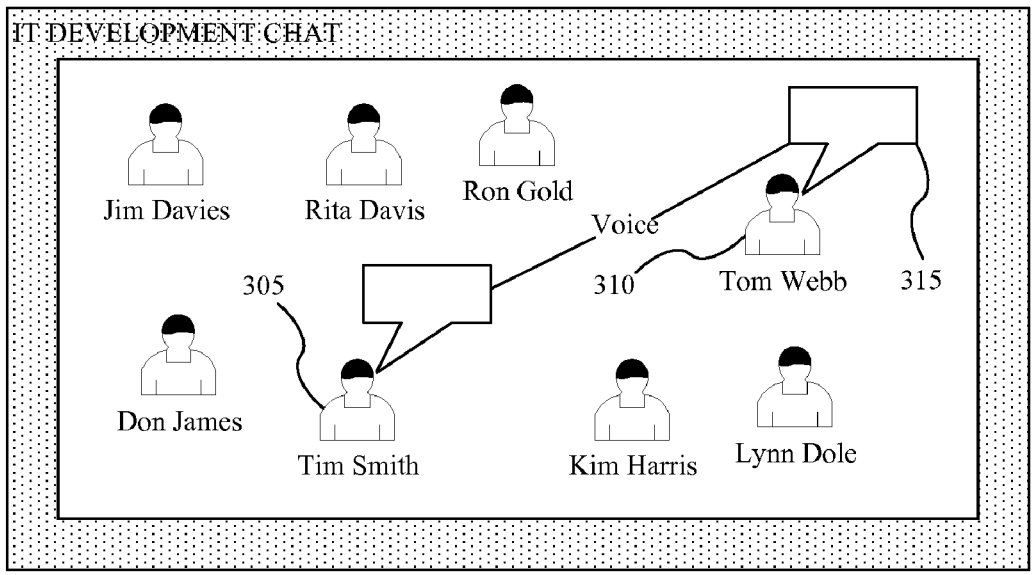
FIG. 3 is a pictorial view illustrating a GUI in accordance with another embodiment of the present invention.

FIG. 3 is a pictorial view illustrating a GUI 300 in accordance with another embodiment of the present invention. GUI 300 can be used, for example, for background monitoring of a collaboration. GUI 300, also referred to as a "peripheral watch area," can allow a user to monitor a collaboration graphically, without utilizing a large percentage of the display area. The graphical nature of GUI 300 simplifies the monitoring of the collaboration.

In GUI 300, each participant in the collaboration can be represented with a unique icon to visually differentiate each of the participants. Each icon in the GUI 300 can represent a participant in a collaboration. Participants can be illustrated in real-time along with the particular collaboration applications being used. For example, icons 305 and 310 can represent two of the participants actively conversing using voice communications, e.g., IP telephony. Icon 315 is a word balloon that may be used to graphically indicate, in real-time, which participants are communicating, in this case speaking, in the collaboration. In this manner the peripheral watch area can display the collaborative applications being used. GUI 300 is presented for purposes of illustration only. It should be appreciated that any of a variety of different controls and visual indicators, whether icons, colors, or the like, may be used to indicate which participants are actively communicating at any given time and the collaborative application(s) being used.

Figure 4:
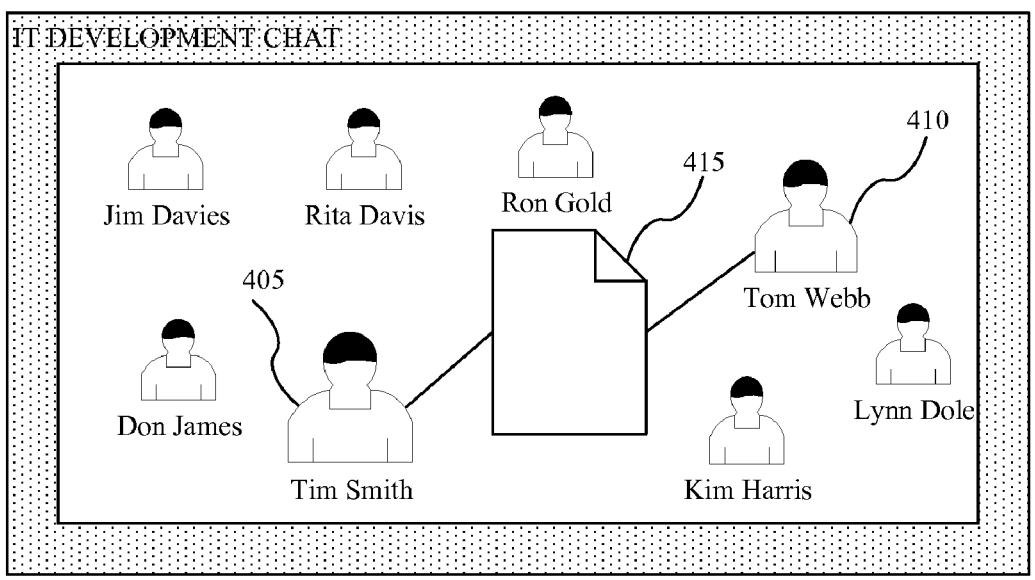
FIG. 4 is a pictorial view illustrating a GUI in accordance with another embodiment of the present invention.

FIG. 4 is a pictorial view illustrating a GUI 400 in accordance with another embodiment of the present invention. In GUI 400, the size of the icons can be dynamically adjusted to illustrate the contribution level of each participant to the collaboration. As can be seen, the icons 405 and 410 are larger in size than the surrounding icons. The increased size of the icons 405 and 410 illustrates the increased level of contribution to the collaboration made by the two participants. Icon 415 represents an electronic document shared by the icons 405 and 410 during the collaboration. The icon 415 is another example of how collaboration context can be graphically represented in the peripheral watch area.

Figure 5:
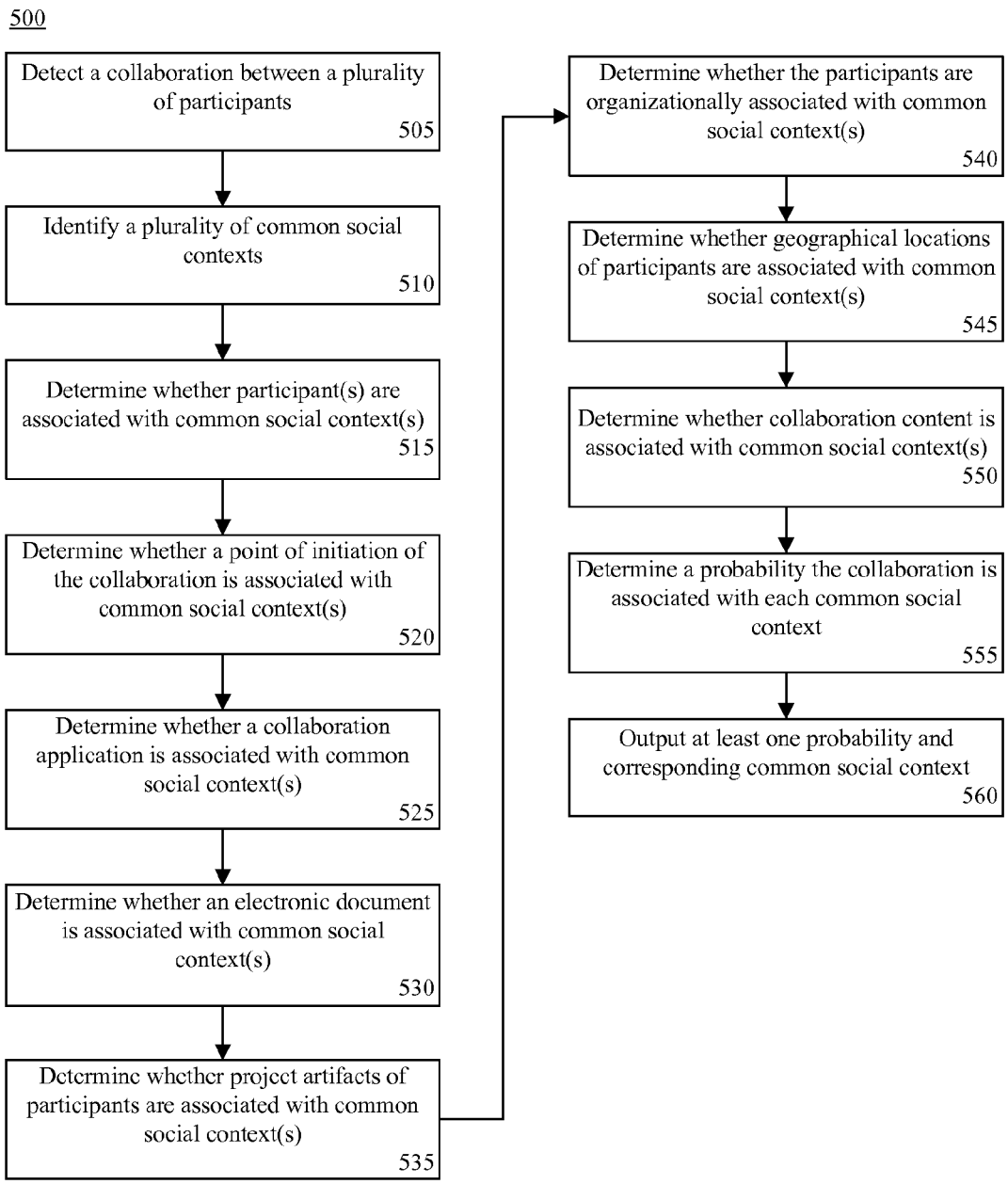
FIG. 5 is a flow chart illustrating a method of determining a common social context in accordance with another embodiment of the present invention.

FIG. 5 is a flow chart illustrating a method of determining a common social context in accordance with another embodiment of the present invention. Method 500 can be implemented using the system described with reference to FIG. 1 or another system with the same or similar functionality. Method 500 can use a series of guidelines to determine probabilities that a collaboration is related to each of a plurality of common social contexts.

In step 505, a collaboration between two or more participants can be detected. Accordingly, each participant in the collaboration can be identified along with the collaborative applications being used. In step 510, a plurality of common social contexts that have been predefined within the system can be identified. The common social contexts may be defined by a system administrator and/or users.

Steps 515-555 present different examples of applying guidelines to determine the common social context for a given collaboration. In step 515, the system can determine whether each participant is associated with a common social context. Participants may be explicitly associated with different common social contexts within the context discovery and visualization system, within an employee directory, or the like. Participants also may be indirectly associated with common social contexts. For example, an electronic document may be associated with a particular common social context. The author of that document may be indirectly associated with the same common social context. For each participant associated with a common social context, the probability of the collaboration belonging to that common social context can be increased.

In step 520, the system can determine a point of initiation for the collaboration and further determine whether the point of initiation is associated with a common social context. Continuing with the earlier example, a collaboration may have begun from a virtual meeting that is associated with a selected common social context. The collaboration, e.g., an instant messaging session, may have begun from a joint editing session of an electronic document stored within a team or project directory. That directory may be associated with a particular common social context. In evaluating the instant messaging session, the system can increase the probability of the common social context associated with the point of initiation for the instant messaging session.

In step 525, the system can determine whether a collaboration application being used in the collaboration is associated with a common social context. As an example, a video conferencing application may be used pervasively with a particular common social context. When video conferencing is identified as the collaborative application being used for the collaboration, the probability of the common social context associated with video conferencing can be increased. In another embodiment, a particular collaborative application may only be available for use by users involved with a particular project, and thus, common social context. In that case, when the collaborative application is used, the system can increase the probability of the common social context associated with the collaborative application.

In step 530, the system can determine whether an electronic document used in the collaboration is associated with a common social context. For example, a study group may be working on a report to improve company efficiency. When the participants in the collaboration access the electronic document including the report, the system can increase the probability that the collaboration concerns the common social context of the study group. The probability of any common social context associated with an electronic document utilized within the collaboration can be increased.

In step 535, the system can determine whether one or more project artifacts of participant(s) are associated with common social contexts. Project artifacts can include to-do items, meetings, deadlines, action items, or the like within a project management system or other calendaring system. As such, project artifacts can indicate project activities, tasks, responsibilities, and duties of a participant. For example, a participant in the collaboration may have a calendar reminder of a weekly meeting of the alpha project. The participant also may be assigned four action items related to the alpha project. The system can identify artifacts associated with a participant and determine the common social contexts with which such artifacts may be associated. The probabilities for the common social contexts associated with the artifacts of the participants can be increased for the collaboration being evaluated. The common social contexts of any meetings that coincide with the collaboration application can be weighted more heavily.

In step 540, the system can determine whether any of the participants are organizationally associated with a common social context. For example, the participant may be the project leader for the alpha project. Accordingly, the system can increase the probability that the collaboration belongs to the common social context of "alpha" based upon the organizational role of the participant(s). The organizational role for each participant can be evaluated to increase the common social context associated with any participant organizational role.

In step 545, the system can determine whether a geographical location of one or more of the participants is associated with a common social context. For example, the home location for the alpha project may be an office in Chicago. If one or more participants are located in Chicago, the system can increase the probability that the collaboration corresponds to the common social context for the alpha project. The common social context associated with any location of a participant may be increased in this manner.

In step 550, the system can determine whether the content of the collaboration is associated with one or more common social contexts. For example, the system can monitor content of the collaboration for keywords, phrases, names, search topics, or the like that may be associated with, or specify the name of, a common social context. As an example, if the word "alpha" is detected during a collaboration involving instant messaging, the probability that the collaboration belongs to the common social context with which alpha is associated, e.g., a common social context for project alpha, may be increased. Repetition of words may cause probabilities to be increased to a greater degree than for cases where no repetition, or less repetition, is detected.

In step 555, the system can determine the probability that the collaboration is associated with each of the plurality of common social contexts. One or more or all of the guidelines described with reference to FIG. 5 may be used in calculating a probability for each respective common social context. As noted, the examples disclosed herein are not intended to be an exhaustive listing of guidelines. Further, as noted, individual ones of the guidelines may be weighted to have a larger or lesser impact upon the probability determination.

In step 560, one or more probabilities, and the corresponding common social context for each probability may be output. In one embodiment, the top "n" probabilities and corresponding common social contexts may be output. For example, the highest probability and corresponding common social context can be output as the likely common social context for the collaboration. As used herein, "output" or "outputting" can include, but is not limited to, writing to a file, writing to a user display or other output device, playing audible notifications, sending or transmitting to another system, exporting, or the like.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

The invention claimed is:

1. A computer-implemented method of determining a common social context comprising:
   detecting by a computer a collaboration between a plurality of participants;
   identifying by a computer a plurality of common social contexts;
   determining by a computer a probability that the collaboration belongs to each of the plurality of common social contexts; and
   outputting at least one probability and corresponding common social context.

2. The computer-implemented method of claim 1, wherein determining a probability further comprises:
   identifying at least one participant in the collaboration;
   determining whether the participant is associated with a particular common social context; and
   increasing the probability the collaboration belongs to the particular common social context when the participant is associated with the particular common social context.

3. The computer-implemented method of claim 1, wherein determining a probability further comprises:
   identifying a point of initiation for the collaboration;
   determining whether the point of initiation is associated with a particular common social context; and
   increasing the probability the collaboration belongs to the particular common social context when the point of initiation is associated with the particular common social context.

4. The computer-implemented method of claim 1, wherein determining a probability further comprises:
   identifying a collaborative application used for the collaboration;
   determining whether the collaborative application is associated with a particular common social context; and
   increasing the probability the collaboration belongs to the particular common social context when the collaborative application is associated with the particular common social context.

5. The computer-implemented method of claim 1, wherein determining a probability further comprises:
   identifying an electronic document used in the collaboration;
   determining whether the electronic document is associated with a particular common social context; and
   increasing the probability the collaboration belongs to the particular common social context when the electronic document is associated with the particular common social context.

6. The computer-implemented method of claim 1, wherein determining a probability further comprises:
   identifying a project artifact of the participant in the collaboration;
   determining whether the project artifact is associated with a particular common social context; and
   increasing the probability the collaboration belongs to the particular common social context when the project artifact is associated with the particular common social context.

7. The computer-implemented method of claim 1, wherein determining a probability further comprises:
   identifying at least one participant of the collaboration;
   determining whether the participant is organizationally associated with a particular common social context; and
   increasing the probability the collaboration belongs to the particular common social context when the participant is organizationally associated with the particular common social context.

8. The computer-implemented method of claim 1, wherein determining a probability further comprises:
   identifying at least one participant of the collaboration;
   determining whether the participant is geographically associated with a particular common social context; and
   increasing the probability the collaboration belongs to the particular common social context when the participant is geographically associated with the particular common social context.

9. The computer-implemented method of claim 1, wherein determining a probability further comprises:
   identifying content used in the collaboration;
   determining whether the content is associated with a particular common social context; and
   increasing the probability the collaboration belongs to the particular common social context when the content is associated with the particular common social context.

10. The computer-implemented method of claim 1, wherein determining a probability further comprises:
    monitoring the probability the collaboration belongs to a particular common social context;
    determining when the probability the collaboration belongs to the particular common social context exceeds a minimum threshold level; and
    outputting an alert when the probability the collaboration belongs to the particular common social context exceeds the minimum threshold level.

11. The computer-implemented method of claim 1, wherein determining a probability further comprises receiving a user action explicitly confirming the collaboration belongs to a particular common social context.

12. A computer-implemented method of visualizing collaborations related to a common social context comprising:
    responsive to a user input, selecting by a computer a common social context;
    dentifying by a computer at least one collaboration related to the common social context;
    identifying by a computer a plurality of participants of the collaboration and at least one collaboration application used for the collaboration;
    presenting by a computer a visual representation of the plurality of participants; and
    dynamically updating by a computer the visual representation to indicate which participants are communicating and the collaboration application being used in real-time.

13. The computer-implemented method of claim 12, wherein dynamically updating the visual representation further comprises:
    displaying each participant as an icon;
    monitoring a contribution of the participant to the collaboration; and
    dynamically sizing the icon of the participant according to the contribution of the participant to the collaboration.

14. The computer-implemented method of claim 12, wherein dynamically updating the visual representation further comprises:
　displaying at least two participants as icons;
　displaying an electronic document as an icon; and
　presenting a visual representation of a sharing of the electronic document between the at least two participants.

15. A computer program product comprising:
　a computer-readable storage medium comprising computer-usable program code stored thereon that determines a common social context, the computer-readable storage medium comprising:
　computer-usable program code that detects a collaboration between a plurality of participants;
　computer-usable program code that identifies a plurality of common social contexts;
　computer-usable program code that determines a probability that the collaboration belongs to each of the plurality of common social contexts; and
　computer-usable program code that outputs at least one probability and corresponding common social context.

16. The computer program product of claim 15, wherein the computer-readable storage medium further comprises:
　computer-usable program code that identifies at least one participant of the collaboration;
　computer-usable program code that determines whether the participant is associated with a particular common social context; and
　computer-usable program code that increases the probability the collaboration belongs to the particular common social context when the participant is associated with the particular common social context.

17. The computer program product of claim 15, wherein the computer-readable storage medium further comprises:
　computer-usable program code that identifies a point of initiation for the collaboration;
　computer-usable program code that determines whether the point of initiation is associated with a particular common social context; and
　computer-usable program code that increases the probability the collaboration belongs to the particular common social context when the point of initiation is associated with the particular common social context.

18. The computer program product of claim 15, wherein the computer-readable storage medium further comprises:
　computer-usable program code that identifies content used in the collaboration;
　computer-usable program code that determines whether the content is associated with a particular common social context; and
　computer-usable program code that increases the probability the collaboration belongs to the particular common social context when the content is associated with the particular common social context.

19. The computer program product of claim 15, wherein the computer-readable storage medium further comprises:
　computer-usable program code that monitors the probability the collaboration belongs to the particular common social context;
　computer-usable program code that determines when the probability the collaboration belongs to a particular common social context exceeds a minimum threshold level; and
　computer-usable program code that outputs an alert when the probability the collaboration belongs to the particular common social context exceeds the minimum threshold level.

20. The computer program product of claim 15, wherein the computer-usable program code that determines a probability further comprises computer-usable program code that receives a user action explicitly confirming the collaboration belongs to a particular common social context.

* * * * *